(12) United States Patent
Yang et al.

(10) Patent No.: US 12,451,765 B2
(45) Date of Patent: Oct. 21, 2025

(54) COOLING ROTARY ELECTRIC MACHINES

(71) Applicant: GM Global Technology Operations LLC, Detroit, MI (US)

(72) Inventors: Xiaofeng Yang, Troy, MI (US); Peng Peng, Columbus, OH (US); Farzad Samie, Franklin, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 314 days.

(21) Appl. No.: 18/314,927

(22) Filed: May 10, 2023

(65) Prior Publication Data
US 2024/0380279 A1  Nov. 14, 2024

(51) Int. Cl.
| | |
|---|---|
| H02K 9/19 | (2006.01) |
| H02K 1/20 | (2006.01) |
| H02K 1/32 | (2006.01) |
| H02K 21/14 | (2006.01) |

(52) U.S. Cl.
CPC ............... *H02K 9/19* (2013.01); *H02K 1/20* (2013.01); *H02K 1/32* (2013.01); *H02K 21/14* (2013.01)

(58) Field of Classification Search
CPC .. H02K 9/19; H02K 1/20; H02K 1/32; H02K 21/14
USPC ............................................. 310/60 A, 61, 54
See application file for complete search history.

(56) References Cited

U.S. PATENT DOCUMENTS

| | | | |
|---|---|---|---|
| 2015/0171707 A1* | 6/2015 | Shoykhet | H02K 9/12 310/54 |
| 2019/0140494 A1* | 5/2019 | Lan | H02K 1/16 |
| 2023/0179051 A1* | 6/2023 | Siepker | H02K 9/19 310/61 |

\* cited by examiner

*Primary Examiner* — Jose A Gonzalez Quinones
(74) *Attorney, Agent, or Firm* — CANTOR COLBURN LLP (57) ABSTRACT

An electric propulsion motor system includes a rotary electric propulsion motor that has a stator and a rotor. An air gap is present between the stator and rotor. A fluid circulation system provides pressurized liquid and gas, which is directed through fluid passages in the stator and/or rotor and into the air gap to establish a mixture of pressurized liquid and pressurized gas therein. The pressurized gas dilutes the mixture and pushes the pressurized liquid and pressurized gas against the stator and rotor, forcing it to exit the air gap at the opposite ends of the motor leaving the air gap free of accumulated liquid.

20 Claims, 7 Drawing Sheets

COOLING ROTARY ELECTRIC MACHINES

INTRODUCTION

Electric vehicles (EV) include one or more electric propulsion motors. Such motors may be lubricated and cooled with circulating fluids, including fluids circulating through stator and rotor structures. Stator cooling fluid circulation paths may include stator jacket containments, axial passages through the stator yoke and axial passages through the roots of the stator teeth. Rotor cooling fluid circulation paths may include axial passages through the rotor yoke including axial passages adjacent interior permanent magnets. However, a major source of motor heat may include the stator windings and primarily the windings at the top of the stator winding slots and at the stator tooth tips. Moreover, circulating fluids may undesirably leak into and accumulate within the air gap between the rotor structure and the stator structure causing quantifiable drag upon the motor rotation resulting in efficiency loss and reduced motor output torque.

SUMMARY

In one exemplary embodiment, a method for cooling a rotary electric machine having a stator, a rotor and an air gap therebetween may include injecting a pressurized liquid into the air gap through at least one of the rotor and the stator, and injecting a pressurized gas into the air gap through at least one of the rotor and the stator, wherein a mixture of the pressurized liquid and the pressurized gas is established within the air gap and the pressurized gas dilutes the mixture sufficiently to force the pressurized liquid and the pressurized gas against the rotor and stator and through the air gap to exit the air gap at axially opposite ends of the rotary electric machine.

In addition to one or more of the features described herein, the pressurized liquid and the pressurized gas may be injected through separate fluid passages in at least one of the rotor and the stator.

In addition to one or more of the features described herein, the pressurized liquid and the pressurized gas may be injected through common fluid passages in at least one of the rotor and the stator.

In addition to one or more of the features described herein, the pressurized liquid and the pressurized gas may be injected through fluid passages located axially central within at least one of the rotor and the stator.

In addition to one or more of the features described herein, the pressurized liquid is provided by a liquid pump and the pressurized gas is provided by an air pump.

In addition to one or more of the features described herein, injecting the pressurized liquid into the air gap may include injecting the pressurized liquid at a plurality of circumferentially distributed locations around the air gap.

In addition to one or more of the features described herein, injecting the pressurized liquid and the pressurized gas into the air gap may include injecting the pressurized liquid and the pressurized gas into a circumferential manifold within the stator and distributing the pressurized liquid from the circulation manifold through a plurality of circumferentially distributed radial fluid distribution runners within the stator into the air gap.

In addition to one or more of the features described herein, injecting the pressurized liquid and the pressurized gas into the air gap may include injecting the pressurized liquid and the pressurized gas into an axial fluid passage within a rotor shaft and distributing the pressurized liquid from the axial fluid passage through a plurality of circumferentially distributed fluid holes and radial fluid distribution runners within the rotor into the air gap.

In addition to one or more of the features described herein, injecting the pressurized liquid and the pressurized gas into the air gap may include injecting the pressurized liquid and the pressurized gas exclusively through fluid passages in the stator.

In addition to one or more of the features described herein, injecting the pressurized liquid and the pressurized gas directly into the air gap may include injecting the pressurized liquid and the pressurized gas exclusively through fluid passages in the rotor.

In another exemplary embodiment, an electric propulsion motor system may include a rotary electric propulsion motor including a stator and a rotor rotatably disposed within the stator, an air gap between the stator and the rotor, a fluid circulation system providing a pressurized liquid and a pressurized gas, and at least one of the stator and the rotor receiving the pressurized liquid and the pressurized gas within respective fluid passages configured to contain and direct the pressurized liquid and pressurized gas through the at least one of the stator and the rotor into the air gap to establish a mixture of the pressurized liquid and the pressurized gas within the air gap, wherein the pressurized gas dilutes the mixture sufficiently to force the pressurized liquid and the pressurized gas against the rotor and stator and through the air gap to exit the air gap at axially opposite ends of the rotary electric propulsion motor.

In addition to one or more of the features described herein, the stator may receive the pressurized liquid and the pressurized gas and the respective fluid passages may include a circumferential manifold within the stator fluidly coupled to a plurality of circumferentially distributed radial fluid distribution runners.

In addition to one or more of the features described herein, the rotor receives the pressurized liquid and the pressurized gas and the respective fluid passages may include an axial fluid passage within a rotor shaft fluidly coupled to a plurality of circumferentially distributed fluid holes and radial fluid distribution runners.

In addition to one or more of the features described herein, the pressurized liquid may include an oil.

In addition to one or more of the features described herein, the pressurized gas may include air.

In addition to one or more of the features described herein, the fluid circulation system may include an oil pump and an air pump.

In addition to one or more of the features described herein, the rotary electric propulsion motor may include an interior permanent magnet motor.

In addition to one or more of the features described herein, the stator may include a plurality of teeth including grooves on tips of the teeth.

In addition to one or more of the features described herein, the stator may include a plurality of teeth defining slots therebetween containing potted winding conductors.

In yet another exemplary embodiment, an electrified vehicle may include an electric drive unit having a rotary electric propulsion motor with a rotor and a cylindrical stator, the rotor rotatably coupled to at least one drive wheel, the cylindrical stator including fluid passages therethrough and at least one fluid pump providing a pressurized oil and pressurized air into the fluid passages, and the fluid passages through the cylindrical stator including a circumferential manifold fluidly coupled to a plurality of circumferentially distributed radial fluid distribution runners open to an air gap between the cylindrical stator and the rotor to provide the pressurized oil and the pressurized air into the air gap and establish a mixture of the pressurized oil and the pressurized air within the air gap, the fluid passages being fabricated within a stack of electrical steel laminations located axially central within the cylindrical stator, wherein the pressurized air dilutes the mixture sufficiently to force the pressurized oil and the pressurized air against the rotor and the cylindrical stator and through the air gap to exit the air gap at axially opposite ends of the rotary electric propulsion motor.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference labels indicate like or corresponding parts and features. Description of parts and features in one drawing is understood to apply to parts and features in other drawings sharing the same reference labels to the extent such parts and features are not otherwise distinguishable through drawing examination by one having ordinary skill in the art or distinguished by additional written description herein.

As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle networks (e.g. Controller Area Network (CAN), Local Interconnect Network (LIN) and in-plant and service-related networks. Control module functions as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

Figure 1:
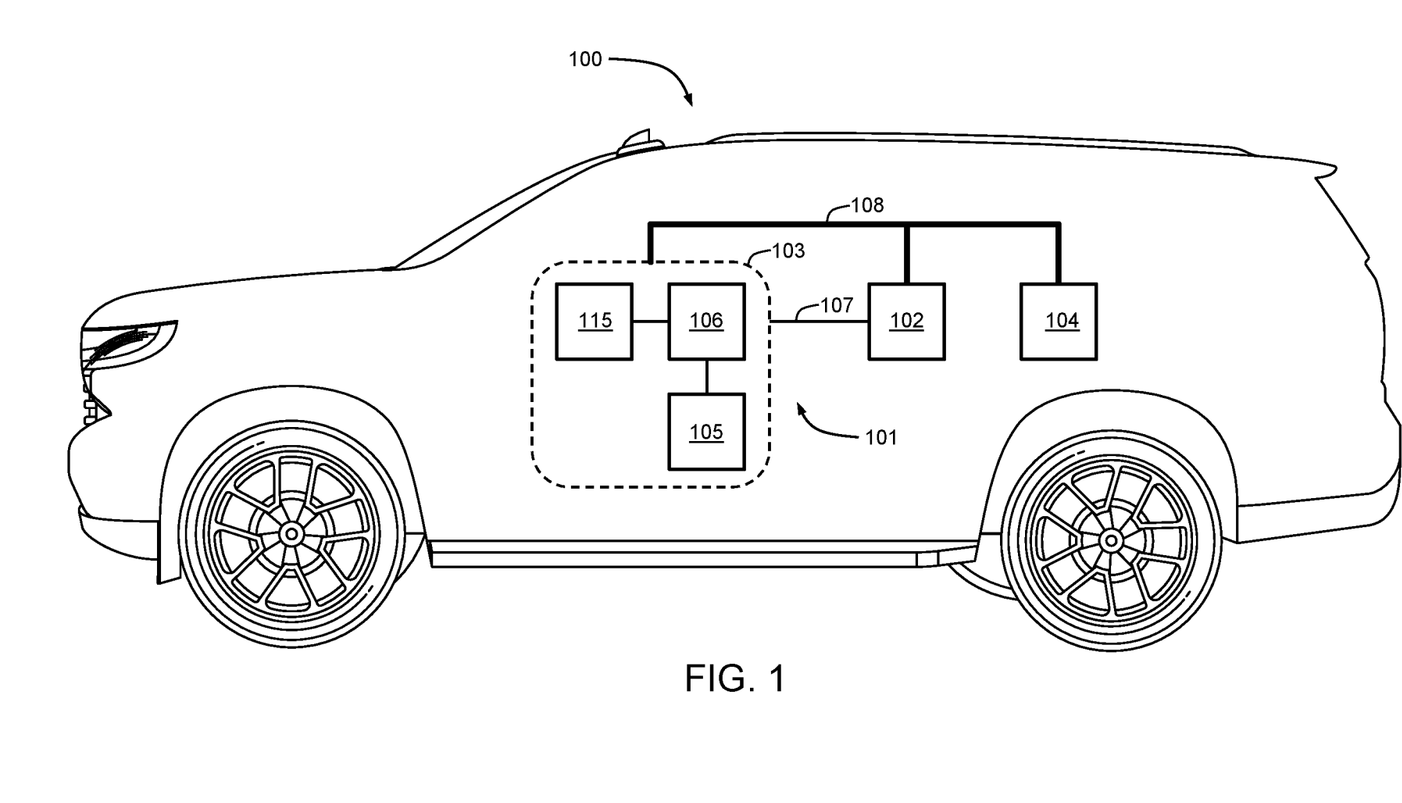
FIG. 1 illustrates a vehicle and propulsion system, in accordance with one or more embodiments.

FIG. 1 is a functional block diagram depicting an exemplary mobile platform as a vehicle 100. Vehicle and vehicular are understood to refer to any means of transportation including non-limiting examples of motorcycles, cars, trucks, buses, excavation, earth moving, construction and farming equipment, railed vehicles like trains and trams, aircraft, and watercraft like ships and boats. As is generally understood, the vehicle 100 may embody a body, chassis, and wheels rotationally coupled to the chassis. The vehicle 100 may be a four wheel vehicle, but the number of wheels may vary in other embodiments. The vehicle 100 may be autonomous or semi-autonomous. The vehicle 100 may include a vehicle propulsion system 101 including a rechargeable energy storage system (RESS) 102, an electric drive unit (EDU) 103 and an electric control unit (ECU) 104. The EDU 103 may include a transmission 115, a fluid circuit 105, and a rotary electric propulsion motor (motor) 106. As used herein, RESS 102 may include a high voltage battery pack primarily for servicing the EDU 103 and one or more low voltage batteries primarily for servicing low voltage vehicle loads. A high voltage (HV) direct current (DC) bus 107 provides electrical power transfer between the EDU 103 and a rechargeable energy storage system 102. In various embodiments, the RESS 102 and the EDU 103 may be operatively coupled to one or more on-vehicle components and systems, including the ECU 104, via a communication bus 108.

The RESS 102 is generally operational to store energy used by the motor 106. In a charging mode, the RESS 102 may receive electrical current from a generator and/or external source. In a discharging mode, the RESS 102 may provide electrical current to the motor 106 and other loads. The RESS 102 may include multiple battery modules electrically connected in series and/or in parallel between a positive battery pack terminal and a negative battery pack terminal. In various embodiments, the RESS 102 may provide approximately 200 to 1,000 volts DC electrical potential between the positive battery pack terminal and the negative battery pack terminal. Other battery voltages may be implemented to meet the design criteria of a particular application. The RESS 102 may be physically and electrically coupled to the HV DC bus 107.

The transmission 115 is generally operational to transfer mechanical torque from the motor 106 to the wheels of the vehicle 100. In various embodiments, the transmission 115 may implement a geared transmission. In other embodiments, the transmission 115 may implement a continuously variable transmission.

The fluid circuit 105 is generally operational to provide working fluids to the motor 106. The fluids may be used to lubricate and/or cool the motor 106. In various embodiments, the fluid may be circulated within the EDU 103 including through the motor 106. In some embodiments, the fluid circuit 105 may include a sump providing a return reservoir for circulated liquid fluid and mechanically or electrically driven fluid pump(s) (e.g., liquid pump and gas pump, or two-phase pump). In some embodiments, the fluid circuit 105 may include fluid routings through a filter and/or a radiator for cooling the circulating fluid. Fluid flow rates may be known to the ECU 104 directly through flow sensing or indirectly through modeling and calibrations. In some embodiments, the fluid may be a liquid and a gas. As used herein, fluid is understood to refer to one or both a liquid or a gas such as an oil or air.

The motor 106 may be a drive motor for the vehicle 100. The motor 106 is generally operational to provide rotation and torque to drive wheels of the vehicle 100. The electrical power consumed by the motor 106 may be provided by the RESS 102 via the HV DC bus 107 to a power inverter (not shown) which converts the DC to multiphase alternating current (AC). The motor 106 may be a multiphase AC motor including a stator and a rotor. The rotor may be rotatably disposed within the stator and separated from the stator by an air gap. Alternatively, the stator may be disposed within the rotor. A rotor shaft may be connected to the rotor. In an embodiment, the rotor and the stator may include respective cores fabricated from stacked laminations of electrical steel. The stator core may generally include a plurality of teeth adjacent to and delimiting winding slots. Stator teeth extend radially from a yoke at a proximal end toward the rotor at a distal end. Exemplary stator structures are described in further detail herein with respect to various embodiments. Various parts and features of the stator, including but not limited to yoke, teeth and conductor slots, may refer to those parts and features of either a complete stator or of portions thereof including stator laminations or groupings thereof.

Figure 2:
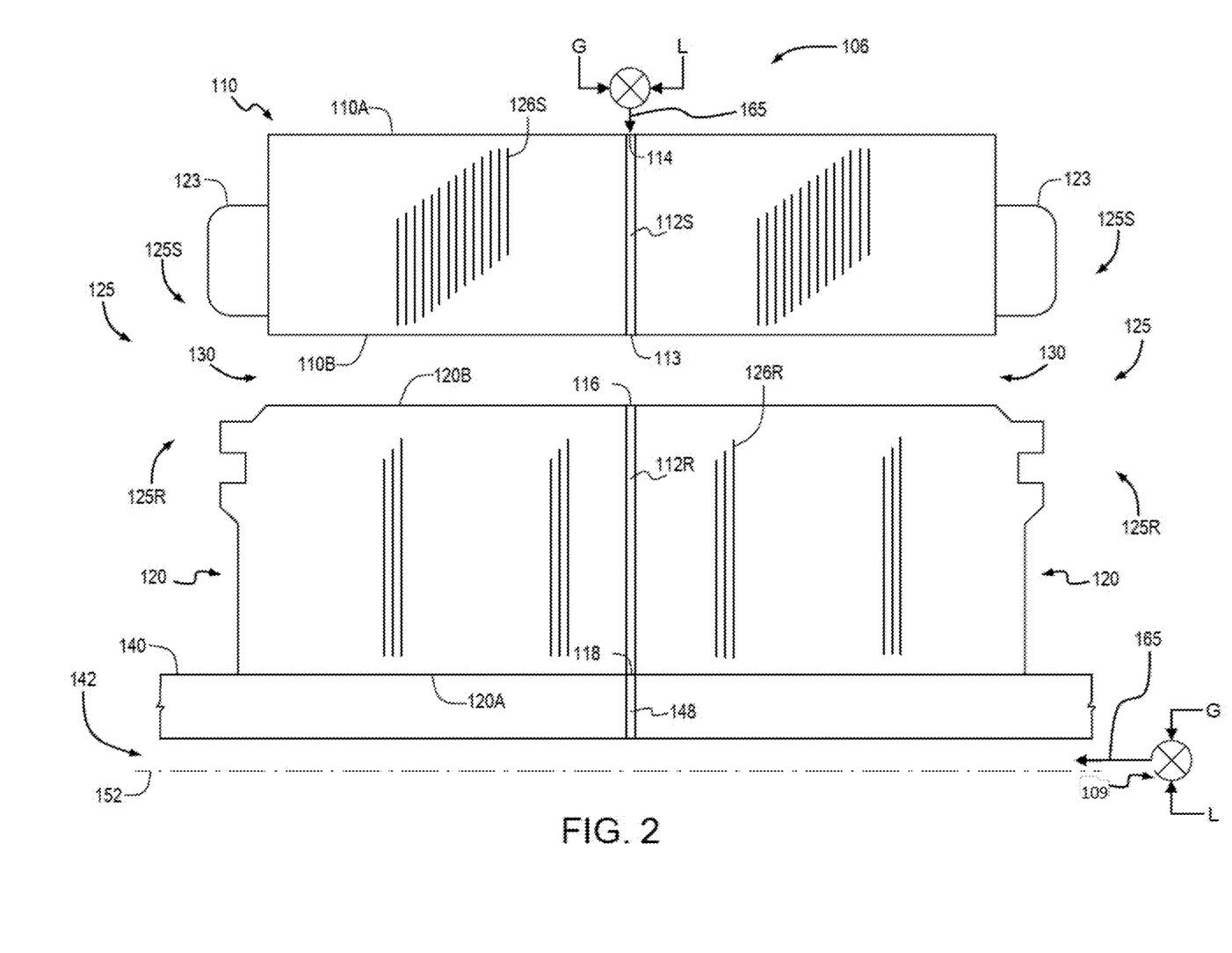
FIG. 2 illustrates a rotary electric propulsion motor, in accordance with one or more embodiments.

Referring to FIG. 2, a schematic diagram of a motor 106 is illustrated in accordance with an exemplary embodiment. The motor 106 may be one embodiment of the motor 106 as generally described herein with respect to FIG. 1. The motor 106 has axially opposite ends 125 and includes a stator 110, a rotor 120, an air gap 130 (dimensionally exaggerated for clarity), and a rotor shaft 140.

The stator 110 may be one embodiment of the stator as generally described herein with respect to FIG. 1. The stator 110 may include multiple stacked stator laminations 126S of electrical steel forming a cylindrical core including a yoke and a plurality of teeth and winding slots set forth in more detail herein. The stator 110 may include multiphase AC windings within the winding slots which receive multiphase AC from a power inverter to establish a rotating magnetic field exerting torque upon the rotor 120. The windings are generally contained within the winding slots with end turns 123 extending beyond the cylindrical core limits at axially opposite ends 125S of the motor 106. The stator 110 may include one or more internal stator fluid passages 112S therethrough. The fluid passages 112S may receive pressurized fluid at or near the outer periphery 110A of the stator 110 at fluid inlets 114. The outer periphery 110A may refer to the outer periphery of the stator 110 or of stator laminations 126S as described further herein. The fluid passages 112S may be located approximately midway between opposite axial ends 125S of the stator 110 and configured to generally direct pressurized fluid radially in the direction of the rotor 120 toward the inner periphery 110B of the stator 110 and exiting into the air gap 130 at fluid outlets 113. The inner periphery 110B of the stator 110 corresponds general to the terminal ends of the stator teeth. Other locations between opposite axial ends 125S of the stator 110 for fluid passages 112S may be employed. In an embodiment, the fluid passages 112S may be formed within one or several adjacent laminations 126 of the lamination stack in accordance with cross section dimensions and fluid flow considerations. One function of the fluid passages 112S is to contain and direct pressurized fluid from the fluid inlets 114, through the stator 110 and into the air gap 130 through the fluid outlets 113.

The rotor 120 may be one embodiment of the rotor as generally described herein with respect to FIG. 1. The rotor 120 may include multiple annular stacked laminations 126R forming a core. In a permanent magnet machine, the stacked rotor laminations may include voids forming interior pockets for carrying permanent magnets. In an induction machine, the stacked laminations may include peripheral slots for carrying conduction bars. Alternative rotor constructions are known to those having ordinary skill in the art and may include, for example, surface mounted permanent magnet and wire wound rotors.

The air gap 130 may provide a physical gap between the inner periphery 110B of the stator 110 and an outer periphery 120B of the rotor 120. In an embodiment, the air gap 130 between the stator 110 and the rotor 120 may be less than a millimeter (mm). In other embodiments, the air gap 130 may be less than 0.5 mm (e.g., 0.2 mm to 0.45 mm). Other sizes of the air gap 130 may be implemented to meet the design criteria of a particular design.

The rotor shaft 140 may be one embodiment of the rotor shaft as generally described herein with respect to FIG. 1. The rotor shaft 140 is affixed to the rotor 120 at an inner periphery 120A and rotates therewith. The rotor shaft 140 may include an axial fluid passage 142 and one or more fluid holes 148. The rotor shaft 140 may be rotatably supported at both ends 125R of the rotor 120 by bearings (not illustrated) and may transfer the mechanical torque generated by the rotor 120 to the transmission 115 (FIG. 1). The rotor shaft 140 spins about an axis of rotation 152. The axial fluid passage 142 may receive pressurized fluid from one end of the rotor shaft 140. From the axial fluid passage 142, the fluid may flow into the fluid holes 148, through fluid inlets 118 into an internal rotor fluid passages 112R in the rotor. The rotor 120 may include one or more internal rotor fluid passages 112R therethrough. The fluid passages 112R are in fluid communication with the fluid holes 148 and the axial fluid passage 142 and may receive pressurized fluid therefrom. The fluid passages 112R may be located approximately midway between opposite axial ends 125R of the rotor 120 and configured to generally direct pressurized fluid radially in the direction of the stator 110 toward the outer periphery 120B of the rotor 120 and exiting into the air gap 130 at fluid outlets 116. Other locations between opposite axial ends 125R of the rotor 120 for fluid passages 112R may be employed. In an embodiment, the fluid passages 112R may be formed within one or several adjacent laminations 126R of the rotor lamination stack in accordance with cross section dimensions and fluid flow considerations. One function of the fluid passages 112R is to contain and direct pressurized fluid from the fluid holes 148 and the axial fluid passage 142, through the rotor 120 and into the air gap 130 through the fluid outlets 116. As with the fluid flow associated with the stator, once fluid has been directed through the rotor, it may be generally free to flow back to a sump or other area within the EDU for retrieval and recirculation.

Pressurized fluids 165 (e.g., liquid fluids and gaseous fluids) are provided into the air gap 130 of the motor to establish a two-phase mixture of liquid fluids and gaseous fluids. Provision of the liquid fluids and gaseous fluids may be variously accomplished. In an embodiment, liquid fluids and gaseous fluids may be separately injected into the air gap 130 with the two-phase mixture being established within the air gap 130. In an embodiment, a two-phase mixture may be established prior to injection into the air gap 130. In an embodiment, one or both of stator 110 fluid passages 112S and rotor 120 fluid passages 112R may be used in the provision of the liquid fluids and gaseous fluids to the air gap 130. In an embodiment, the pressurized liquid fluid may be an oil (L) and the pressurized gaseous fluid may be air (G), though alternative liquid fluids and gaseous fluids may be employed. In an embodiment, a two-phase mixture of pressurized oil (L) and pressurized air (G) may be injected into the air gap 130 via one or more stator fluid passages 112S, one or more rotor fluid passages 112R or a combination of one or more stator fluid passages 112S and one or more rotor fluid passages 112R. In an embodiment, pressurized oil (L) and pressurized air (G) may be provided via common fluid passages. In an embodiment, pressurized oil (L) and pressurized air (G) may be provided via separate fluid passages. In an embodiment, pressurized oil (L) may be provided via one or more rotor fluid passages 112R and pressurized air (G) may be provided via one or more stator fluid passages 112S. In an embodiment, pressurized oil (L) may be provided via one or more stator fluid passages 112S and pressurized air (G) may be provided via one or more rotor fluid passages 112R.

In an embodiment, pressurized oil (L) may be provided by an oil pump and pressurized air (G) may be provided by an air pump. In an embodiment, pressurized oil (L) and pressurized air (G) may be provided simultaneously as a mixture by a two-phase pump 109, as shown in FIG. 2. In an embodiment, pressurized oil (L) and pressurized air (G) provided by respective pumps may be combined by a mixing valve, an air injection nozzle, a static mixer, a passive combiner or any suitable means of combination including pressure and flow rate controls. A two-phase mixture of oil and air may be established prior to injection into the air gap or may be established in-situ within the air gap from separately injected pressurized oil and pressurized air components. In an embodiment, oil pumps, air pumps and two-phase pumps may be electrically, mechanically, or hydraulically driven. Mechanically driven pumps may be driven off the mechanical rotation of the rotor shaft 140 or a rotating component of the transmission 115 and may include a controllable clutch mechanism. Electrically driven pumps may be driven by an electric motor powered by a low voltage battery of the RESS 102. The controllable clutch mechanism and the electric motor may be signally coupled to the ECU 104 for receiving control commands therefrom and providing information thereto. The fluid pump(s) may source oil from a sump within the EDU 103 and may source ambient air from within the EDU envelope generally or through positive draw intake in communication with ambient air outside the EDU 103.

Figure 9:
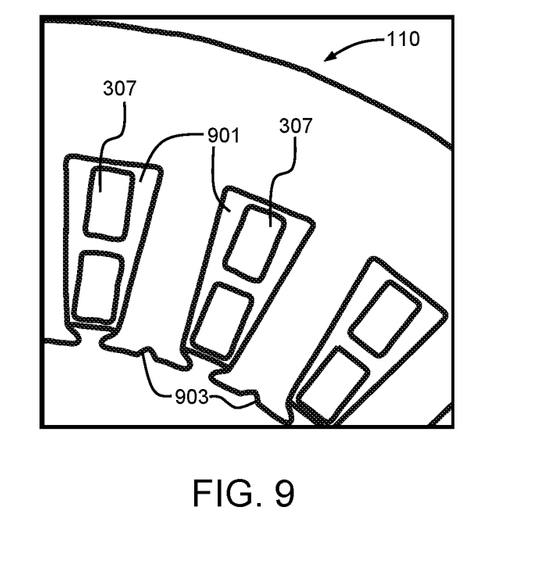
FIG. 9 illustrates teeth features of a stator, in accordance with one or more embodiments.

The pressurized oil (L) and pressurized air (G) injected into the air gap 130 of a rotating motor (separately or as a two-phase mixture) may advantageously facilitates the convective heat transfer from the stator 110 and the rotor 120 to a constant circulation of oil while preventing the accumulation of oil within the air gap 130 which would otherwise cause unacceptable spin losses (i.e., drag). Centrifugal forces upon the oil on the outer periphery 120B of the rotor 120 may urge some of the oil to the inner periphery 110B of the stator 110. The pressurized air (G) may dilute the mixture sufficiently to force the liquid and the gas against the rotor and stator at opposite sides of the air gap 130 and through the air gap to exit the air gap at axially opposite ends of the motor. Oil on the outer periphery 120B of the rotor 120 and on the inner periphery 110B of the stator 110 may be forced by the pressures and flow rates of the oil and the air from the fluid outlets 113, 116 against the rotor and stator and through the air gap to exit out the axially opposite ends 125 of the motor 106, thus keeping the air gap 130 open and thereby reducing drag on the rotor. Advantageously, oil adheres to the inner periphery 110B of the stator 110 by surface tension and absorbs heat from the stator tooth tips and the top windings in the stator slots. In an embodiment detail of an exemplary stator 110 shown in FIG. 9, stator windings 307 may be potted 901 within the stator slots with a dielectric epoxy or equivalent. In an embodiment, the stator tooth tips may include surface features such as axial grooves 903 which may increase the local surface tension and heat exchange area in contact with the oil. It is appreciated that air gap spin losses due to accumulated oil within the air gap may vary with rotor speed. And, at higher speeds, may be approximately proportional to the square of rotor speed. Simulations of gap accumulation of oil has demonstrated that at low speeds of operation (e.g., below about 1500 RPM in an embodiment), fluid accumulated in the air gap may cause relatively high spin losses. Simulations of fluid accumulated in the air gap has also demonstrated that at some point in regions of low-speed operation (e.g., between about 1000 RPM and 2000 RPM in an embodiment), oil in the air gap may be pushed away from the rotor outer diameter resulting in relatively low spin losses. Additional simulations of fluid accumulated in the air gap has demonstrated that at operating speeds above an intermediate speed of operation (e.g., about 5000 RPM in an embodiment), oil in the air gap may be stuck on the rotor outer diameter resulting in relatively high spin losses. Thus, it is appreciated that certain speed operating regions of the motor may benefit more from a two-phase mixture of pressurized oil and air and selective control of oil provision and air provision across the motor operating speed range may be advantageous.

Figure 3:
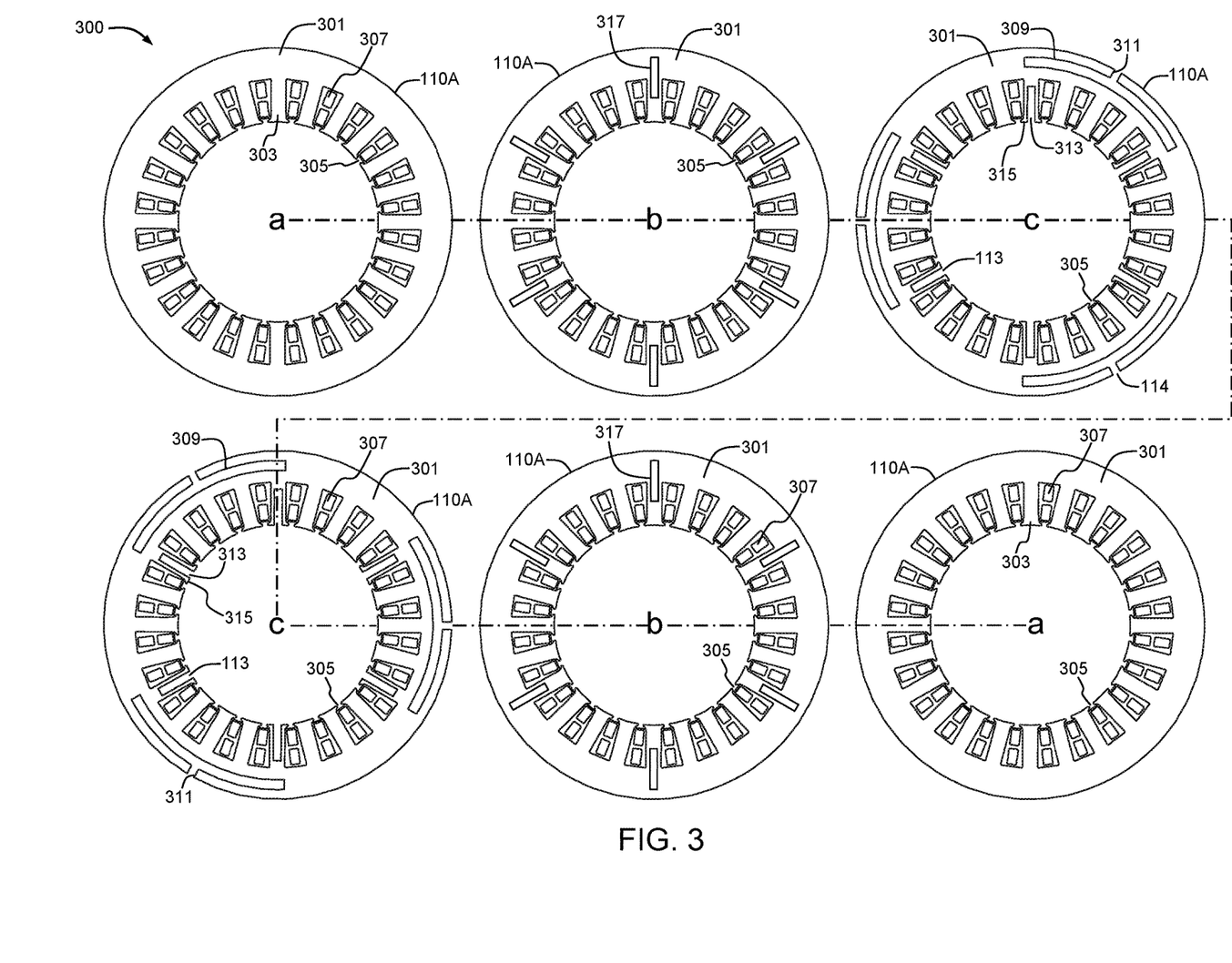
FIG. 3 illustrates a disassembled stator lamination stack, in accordance with one or more embodiments.
Figure 4:
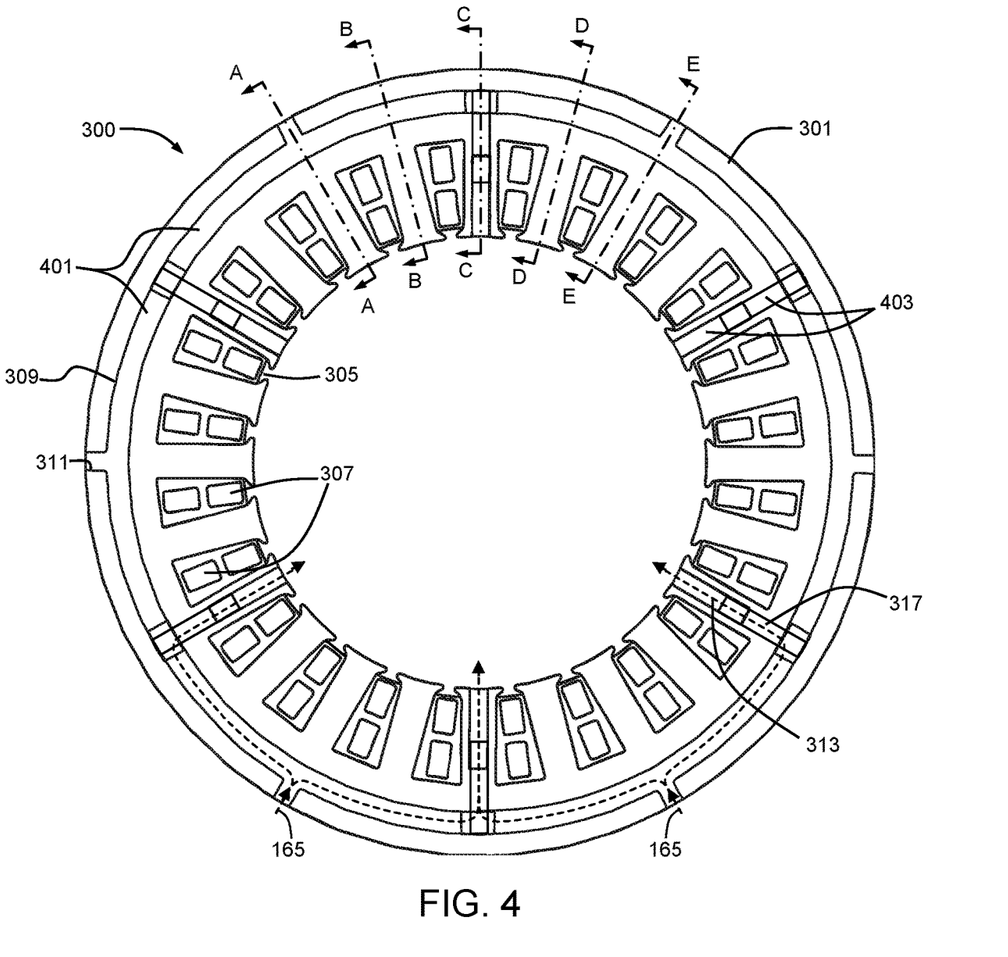
FIG. 4 illustrates an assembled stator lamination stack, in accordance with one or more embodiments.
Figure 5A:
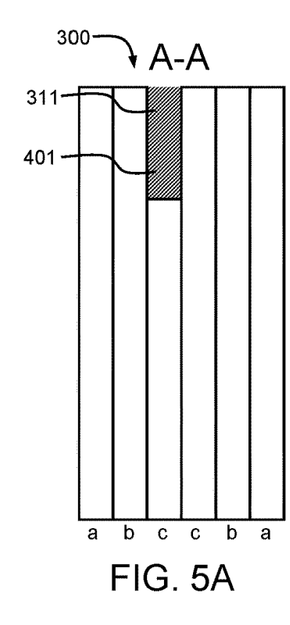
FIGS. 5A through 5E illustrate partial sectional views of the assembled stator lamination stack of FIG. 4, in accordance with one or more embodiments.
Figure 5B:
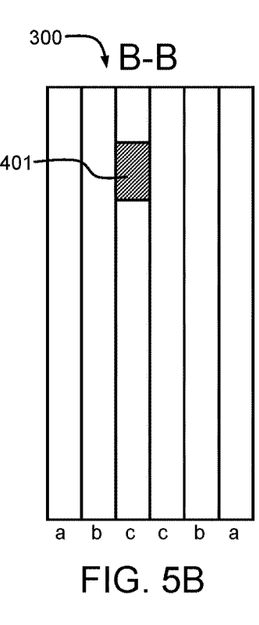
Figure 5C:
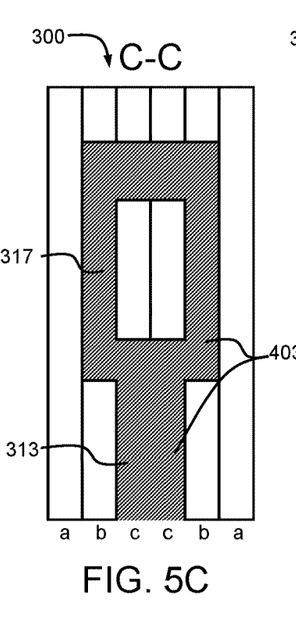
Figure 5D:
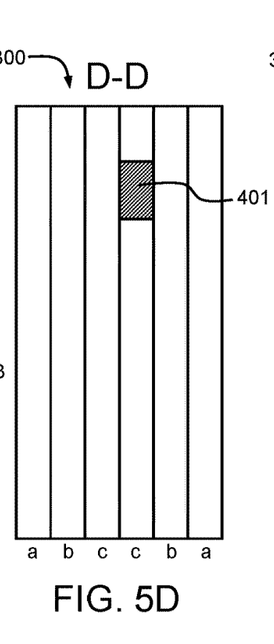
Figure 5E:
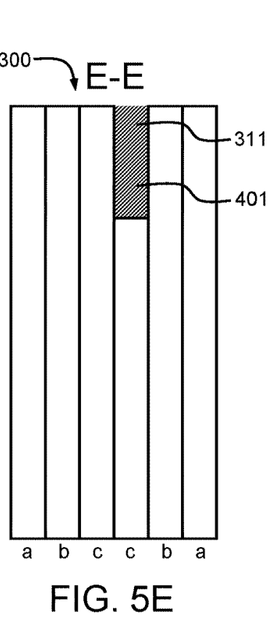

Reference is made to FIGS. 3, 4 and 5A through 5E. In an embodiment, stator fluid passages 112S may be provided by a stator lamination stack 300 of laminations (a), (b), (c) shown separated for clarity in FIG. 3, stacked in a transparent view in FIG. 4 and in various sections A through E in FIGS. 5A through 5E as called out in FIG. 4. In an embodiment, stator fluid passages 112S may be fabricated from stator lamination standards—that is stator laminations that provide the basic stator structure and bulk of the stator lamination stack. For example, FIG. 3 illustrates standard stator laminations (a) which may be stamped from electrical steel in conventional processing. The stator laminations (a) include a yoke 301 and teeth 303 extending radially inward therefrom. The teeth 303 are in spaced adjacency with the space defining slots 305 for winding conductors 307. FIG. 3 also illustrates two other types of laminations (b) and (c). The laminations (c) have arcuate slots 309 defined within the yoke 301 and feed slots 311 open through the outer periphery 110A at fluid inlets 114 communicating with the arcuate slots through the outer periphery 110A of the lamination. The laminations (c) also have open radial slots 313 open at the corresponding tooth tips 315 at fluid outlets 113 and extending part way up through the corresponding tooth toward the yoke 301. In the exemplary laminations (c), three arcuate slots 309 are illustrated separated by 120 degrees. Each slot spans about 60 degrees plus an additional overlap length of, for example, about 5 degrees for a total span of about 70 degrees. The laminations (b) have closed radial slots 317 defined within the yoke 301 and corresponding teeth 303. In the exemplary laminations (b), six open radial slots 313 are illustrated separated by 60 degrees. Advantageously, the laminations (b) and (c) may be fabricated from stator lamination standards (i.e., laminations (a)) through additional stamping stations, adaptive punches, laser cutting, etc.

In an embodiment, the stator lamination stack 300 providing stator fluid passages 112S may be fabricated by stacking a pair of laminations (c) that are offset 60 degrees such that the arcuate slots 309 overlap at the ends to form a circumferentially continuous fluid manifold 401 (FIG. 4) within the yoke 301 with feed slots 311 every 60 degrees. A pair of laminations (b) on opposite sides of the pair of laminations (c) may provide closed radial slots 317 overlapping the arcuate slots 309 and the open radial slots 313 to form radial fluid distribution runners 403 fluidly coupling the arcuate slots 309 of the fluid manifold 401 to the air gap 130. A pair of laminations (a) on opposite sides of the pair of laminations (b) may provide axial closure of the closed radial slots 317. Thus, the stator lamination stack 300 provides stator fluid passages 112S including multiple distributed feed slots 311, a fluid manifold 401, and radial fluid distribution runners 403. The stator lamination stack 300 may be located centrally in the overall stack making up the stator 110 but may be located anywhere within the overall stator stack. The embodiment of the lamination stack is understood to be exemplary and not limiting to alternative structures. For example, the number of laminations of each type may be varied to adapt the flow capacity and reduce fluid restrictions. Similarly, the thickness of the laminations may be increased to similar effect. The number of arcuate slots 309 and/or feed slots 311 may be more or less than shown. As well, the angular distribution of arcuate slots 309 and feed slots 311 may be altered. As few as a one, up to a number corresponding to the number of teeth, radial fluid distribution runners 403 may be employed.

Figure 6:
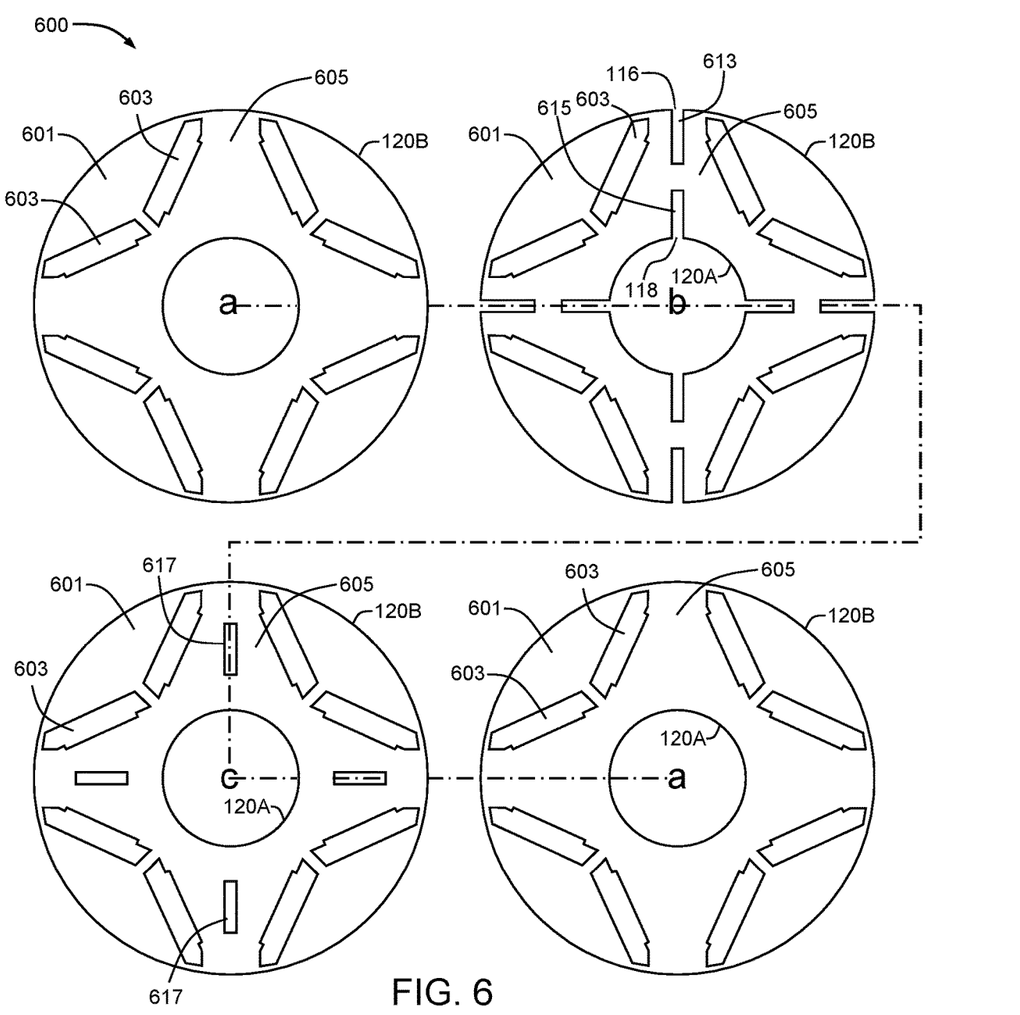
FIG. 6 illustrates a disassembled rotor lamination stack, in accordance with one or more embodiments.
Figure 7:
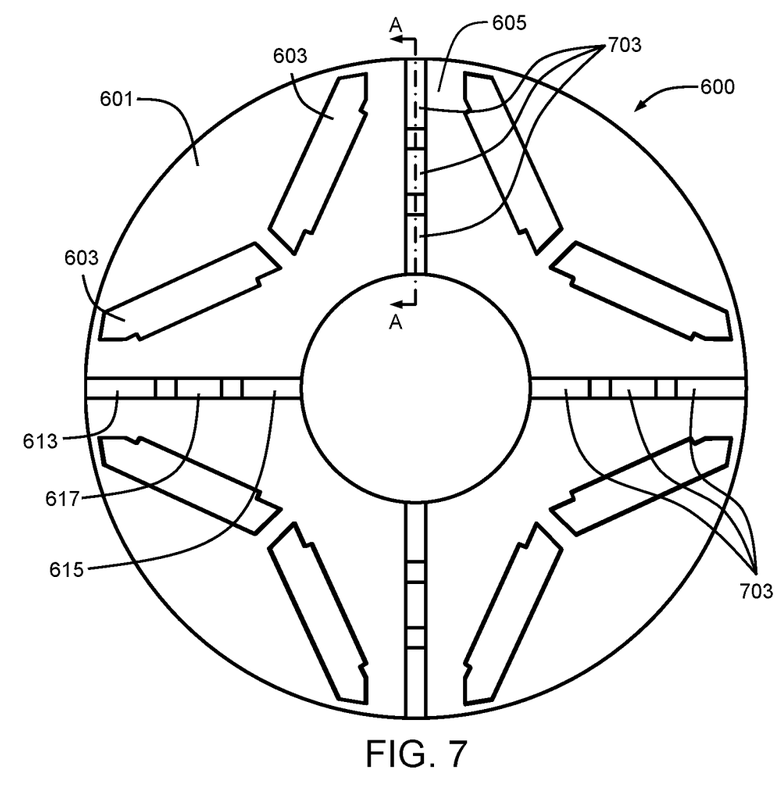
FIG. 7 illustrates an assembled rotor lamination stack, in accordance with one or more embodiments.
Figure 8:
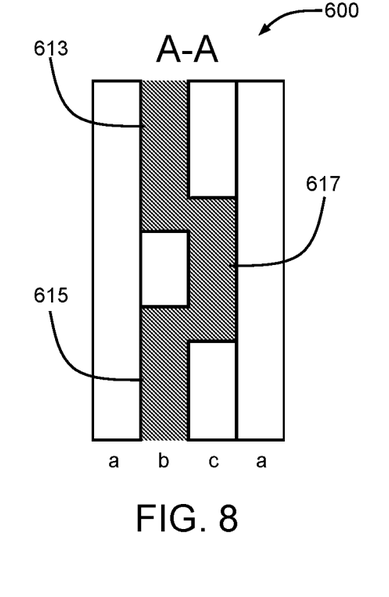
FIG. 8 illustrates a partial sectional view of the assembled rotor lamination stack of FIG. 7, in accordance with one or more embodiments.

Reference is made to FIGS. 6, 7 and 8. In an embodiment, rotor fluid passages 112R may be provided by a lamination stack 600 of laminations (a), (b), (c) shown separated for clarity in FIG. 6, stacked in a transparent view in FIG. 7 and in a section A in FIG. 8 as called out in FIG. 7. In an embodiment, rotor fluid passages 112R may be fabricated from rotor lamination standards—that is rotor laminations that provide the basic rotor structure and bulk of the rotor lamination stack. For example, FIG. 6 illustrates standard rotor laminations (a) which may be stamped from electrical steel in conventional processing. The rotor laminations (a) may include pole pieces 601, magnet slots 603 in pole pairs flanking the pole pieces, and flux return paths 605 between pole pair magnet slots 603. FIG. 6 also illustrates two other types of laminations (b) and (c). The laminations (c) have open radial slots 613 open at the outer periphery 120B through fluid outlets 116 and extending radially part way through the corresponding return path 605. The laminations (c) also have open radial slots 615 open at the inner periphery 120A through fluid inlets 118 and extending radially part way through the corresponding return path 605. In the exemplary laminations (c), there are four pole pair magnet slots 603 and four flux return paths 605 between pole pair magnet slots 603. The laminations (b) have closed radial slots 617 defined between the pole pair magnet slots 603 in the four flux return paths 605. Advantageously, the laminations (b) and (c) may be fabricated from rotor lamination standards (i.e., laminations (a)) through additional stamping stations, adaptive punches, laser cutting, etc.

In an embodiment, the rotor lamination stack 600 providing rotor fluid passages 112R may be fabricated by stacking a pair of laminations (b) and (c) such that the closed radial slots 617 overlap the open radial slots 613 and 615 at the respective closed ends to form radial fluid distribution runners 703 fluidly coupling the fluid inlets 118 to the air gap 130. A pair of laminations (a) on opposite sides of the pair of laminations (b) and (c) may provide axial closure of the radial slots 613, 615 and 617. Thus, the rotor lamination stack 600 provides rotor fluid passages 112R including multiple distributed radial fluid distribution runners 703. The rotor lamination stack 600 may be located centrally in the overall stack making up the rotor 120 but may be located anywhere within the overall rotor stack. The embodiment of the rotor lamination stack is understood to be exemplary and not limiting to alternative structures. For example, the number of laminations of each type may be varied to adapt the flow capacity and reduce fluid restrictions. Similarly, the thickness of the laminations may be increased to similar effect. As few as a one, up to a number corresponding to the number of return paths 605, radial fluid distribution runners 703 may be employed.

The terminology used herein is for the purpose of describing particular embodiments only and is not intended to be limiting. The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

When an element such as a layer, film, region, or substrate is referred to as being "on" another element, it can be directly on the other element or intervening elements may also be present. In contrast, when an element is referred to as being "directly on" another element, there are no intervening elements present. Therefore, unless explicitly described as being "direct," when a relationship between first and second elements is described in the above disclosure, that relationship may be a direct relationship where no other intervening elements are present between the first and second elements but may also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for cooling a rotary electric machine having a stator, a rotor and an air gap therebetween, comprising:
    injecting a pressurized liquid into the air gap through at least one of the rotor and the stator; and
    injecting a pressurized gas into the air gap through at least one of the rotor and the stator,
    wherein the pressurized liquid and the pressurized gas are provided simultaneously as a pre-mixed two-phase fluid by a two-phase pump, and
    wherein a mixture of the pressurized liquid and the pressurized gas is established within the air gap and the pressurized gas dilutes the mixture sufficiently to force the pressurized liquid and the pressurized gas against the rotor and stator and through the air gap to exit the air gap at axially opposite ends of the rotary electric machine.

2. The method for cooling a rotary electric machine of claim 1, wherein the pre-mixed two-phase fluid is injected through separate fluid passages in the rotor and the stator.

3. The method for cooling a rotary electric machine of claim 1, wherein the pre-mixed two-phase fluid is injected through common fluid passages in at least one of the rotor and the stator.

4. The method for cooling a rotary electric machine of claim 1, wherein the pressurized liquid and the pressurized gas are injected through fluid passages located axially central within at least one of the rotor and the stator.

5. The method for cooling a rotary electric machine of claim 1, wherein injecting the pressurized liquid into the air gap comprises injecting the pressurized liquid at a plurality of circumferentially distributed locations around the air gap.

6. The method for cooling a rotary electric machine of claim 1, wherein injecting the pressurized liquid and the pressurized gas into the air gap comprises injecting the pressurized liquid and the pressurized gas into a circumferential manifold within the stator and distributing the pressurized liquid from the circulation manifold through a plurality of circumferentially distributed radial fluid distribution runners within the stator into the air gap.

7. The method for cooling a rotary electric machine of claim 1, wherein injecting the pressurized liquid and the pressurized gas into the air gap comprises injecting the pressurized liquid and the pressurized gas into an axial fluid passage within a rotor shaft and distributing the pressurized liquid from the axial fluid passage through a plurality of circumferentially distributed fluid holes and radial fluid distribution runners within the rotor into the air gap.

8. The method for cooling a rotary electric machine of claim 1, wherein injecting the pressurized liquid and the pressurized gas into the air gap comprises injecting the pressurized liquid and the pressurized gas exclusively through fluid passages in the stator.

9. The method for cooling a rotary electric machine of claim 1, wherein injecting the pressurized liquid and the pressurized gas directly into the air gap comprises injecting the pressurized liquid and the pressurized gas exclusively through fluid passages in the rotor.

10. An electric propulsion motor system, comprising:
    a rotary electric propulsion motor including a stator and a rotor rotatably disposed within the stator;
    an air gap between the stator and the rotor;
    a fluid circulation system including a two-phase pump configured to provide a pre-mixed two-phase fluid comprising a pressurized liquid and a pressurized gas; and
    at least one of the stator and the rotor receiving the pressurized liquid and the pressurized gas within respective fluid passages configured to contain and direct the pressurized liquid and pressurized gas through the at least one of the stator and the rotor into the air gap to establish a mixture of the pressurized liquid and the pressurized gas within the air gap;
    wherein the pressurized gas dilutes the mixture sufficiently to force the pressurized liquid and the pressurized gas against the rotor and stator and through the air gap to exit the air gap at axially opposite ends of the rotary electric propulsion motor.

11. The electric propulsion motor system of claim 10, wherein the stator receives the pressurized liquid and the pressurized gas and the respective fluid passages comprise a circumferential manifold within the stator fluidly coupled to a plurality of circumferentially distributed radial fluid distribution runners.

12. The electric propulsion motor system of claim 10, wherein the rotor receives the pressurized liquid and the pressurized gas and the respective fluid passages comprise an axial fluid passage within a rotor shaft fluidly coupled to a plurality of circumferentially distributed fluid holes and radial fluid distribution runners.

13. The electric propulsion motor system of claim 10, wherein the pressurized liquid comprises an oil.

14. The electric propulsion motor system of claim 10, wherein the pressurized gas comprises air.

15. The electric propulsion motor system of claim 10, wherein the rotary electric propulsion motor comprises an interior permanent magnet motor.

16. The electric propulsion motor system of claim 10, wherein the stator comprises a plurality of teeth including grooves on tips of the teeth.

17. The electric propulsion motor system of claim 10, wherein the stator comprises a plurality of teeth defining slots therebetween containing potted winding conductors.

18. An electrified vehicle, comprising:
- an electric drive unit including a rotary electric propulsion motor having a rotor and a cylindrical stator, the rotor rotatably coupled to at least one drive wheel, the cylindrical stator including fluid passages therethrough and a two-phase pump configured to provide a pre-mixed two-phase fluid comprising a pressurized oil and pressurized air into the fluid passages; and
- the fluid passages through the cylindrical stator including a circumferential manifold fluidly coupled to a plurality of circumferentially distributed radial fluid distribution runners open to an air gap between the cylindrical stator and the rotor to provide the pressurized oil and the pressurized air into the air gap and establish a mixture of the pressurized oil and the pressurized air within the air gap, the fluid passages being fabricated within a stack of electrical steel laminations located axially central within the cylindrical stator;
- wherein the pressurized air dilutes the mixture sufficiently to force the pressurized oil and the pressurized air against the rotor and the cylindrical stator and through the air gap to exit the air gap at axially opposite ends of the rotary electric propulsion motor.

19. The method for cooling a rotary electric machine of claim 1, wherein the two-phase pump is configured to independently control the flow rates of the pressurized liquid and the pressurized gas to achieve a predetermined ratio of liquid to gas in the pre-mixed two-phase fluid.

20. The method for cooling a rotary electric machine of claim 1, wherein the pre-mixed two-phase fluid is injected into the air gap at a location axially central between opposite ends of the stator, such that the mixture flows axially outward toward both ends of the rotary electric machine.

\* \* \* \* \*